(12) United States Patent
Lindgren

(10) Patent No.: US 8,881,683 B2
(45) Date of Patent: Nov. 11, 2014

(54) FISH CAGE SCREEN AND CLEANING APPARATUS

(76) Inventor: Peter B. Lindgren, Pompano Beach, FL (US)

( * ) Notice: Subject to any disclaimer, the term of this patent is extended or adjusted under 35 U.S.C. 154(b) by 328 days.

(21) Appl. No.: 13/085,911

(22) Filed: Apr. 13, 2011

(65) Prior Publication Data

US 2012/0260861 A1    Oct. 18, 2012

(51) Int. Cl.
| | |
|---|---|
| *A01K 75/00* | (2006.01) |
| *A46D 1/00* | (2006.01) |
| *A01K 61/00* | (2006.01) |
| *A46B 3/00* | (2006.01) |
| *A46B 13/00* | (2006.01) |

(52) U.S. Cl.
CPC ............... *A01K 61/003* (2013.01); *A46B 3/005* (2013.01); *A46D 1/0253* (2013.01); *A46D 1/0207* (2013.01); *A01K 75/00* (2013.01); *A46B 13/008* (2013.01)
USPC .......................................... 119/232; 119/264

(58) Field of Classification Search
USPC .................................. 119/215, 223, 232, 264
IPC ....................................................... A01K 75/00
See application file for complete search history.

(56) References Cited

U.S. PATENT DOCUMENTS

| | | | |
|---|---|---|---|
| 1,849,410 A | 3/1932 | Selquist | |
| 3,394,922 A | 7/1968 | Bradbury | |
| 3,628,489 A | 12/1971 | Michaelsen | |
| 3,901,480 A | 8/1975 | Basile et al. | |
| 3,964,213 A | 6/1976 | Tobey | |
| 4,084,535 A | 4/1978 | Rees | |
| 4,252,081 A | 2/1981 | Smith | |
| 4,493,125 A | 1/1985 | Collis | |
| 4,690,384 A | 9/1987 | Palmer | |
| 4,733,427 A | 3/1988 | Conrad | |
| 4,838,193 A | 6/1989 | van der Tak | |
| 4,899,990 A | 2/1990 | Winders et al. | |
| 4,970,747 A | 11/1990 | Pastore | |
| 5,078,365 A | 1/1992 | Fultz | |
| 5,275,383 A | 1/1994 | Wick et al. | |

(Continued)

FOREIGN PATENT DOCUMENTS

| | | |
|---|---|---|
| JP | 56262188 | 5/1981 |
| JP | 8228641 | 9/1996 |

(Continued)

OTHER PUBLICATIONS

Translation Machine JP 08228641 A, Cleaning device for wire netting of fish preserve, Feb. 28, 1995.*

(Continued)

*Primary Examiner* — Shadi Baniani
(74) *Attorney, Agent, or Firm* — McHale & Slavin, P.A.

(57) ABSTRACT

The device includes a screen cleaning brush with multiple fibers or cleaning fingers made from a flexible material with a hook and barb shape. The hook is designed to trap the screen strand as it passes and rotates on a flexible arm to clean the adjacent and opposite side of the strand and then flexes to release the strand. The instant invention has a unique propulsion system and navigation system that enables automatic navigation of the cleaning apparatus on the screen of the aquaculture cage. Alternative the screen cleaning can be performed with a frame having fins to assist in the directional placement of the cleaning fingers against a submersed screen.

10 Claims, 13 Drawing Sheets

(56) References Cited

U.S. PATENT DOCUMENTS

| | | | |
|---|---|---|---|
| 5,735,508 A | 4/1998 | Lancour et al. | |
| 5,930,862 A | 8/1999 | Garrett | |
| 6,070,547 A | 6/2000 | Achord | |
| 6,886,486 B2 | 5/2005 | Van Rompay | |
| 7,748,349 B2 | 7/2010 | Thorvardarson et al. | |
| 2002/0073493 A1 | 6/2002 | Walton | |

FOREIGN PATENT DOCUMENTS

| | | | |
|---|---|---|---|
| JP | 08228641 A | * | 9/1996 |
| JP | 09009818 A | * | 1/1997 |
| JP | 09044238 A | * | 2/1997 |
| JP | 10035587 A | * | 2/1998 |
| WO | WO9858535 A1 | | 12/1998 |
| WO | WO2009110802 | | 9/2009 |

OTHER PUBLICATIONS

Translation Machine JP 1035587 A, Underwater robot, Jul. 26, 1996.*

* cited by examiner

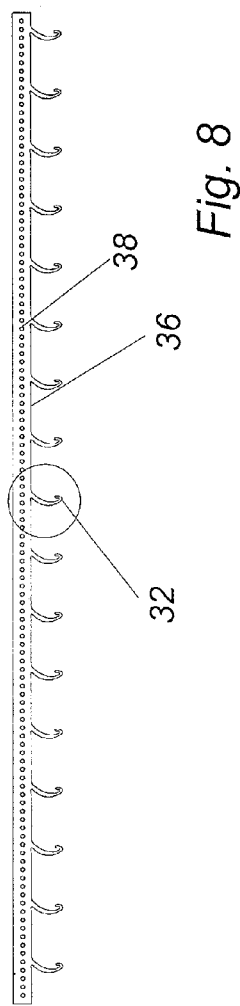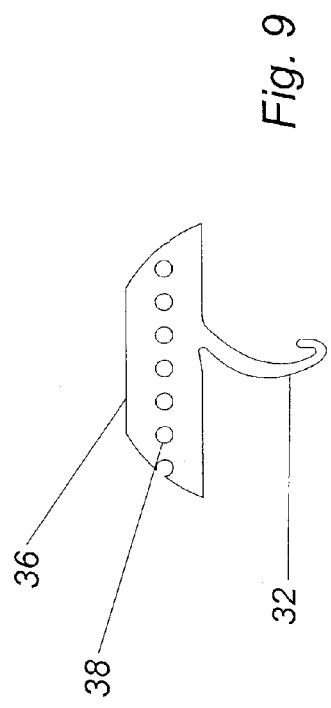

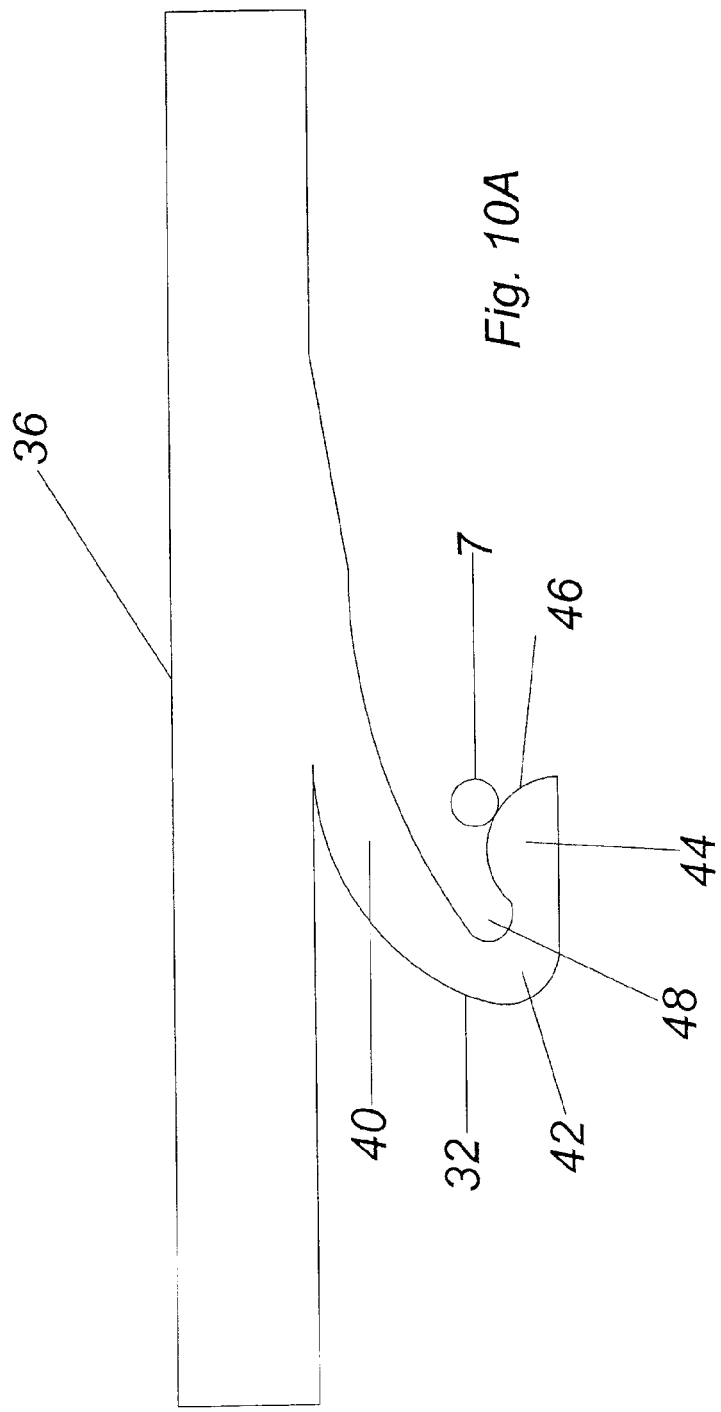

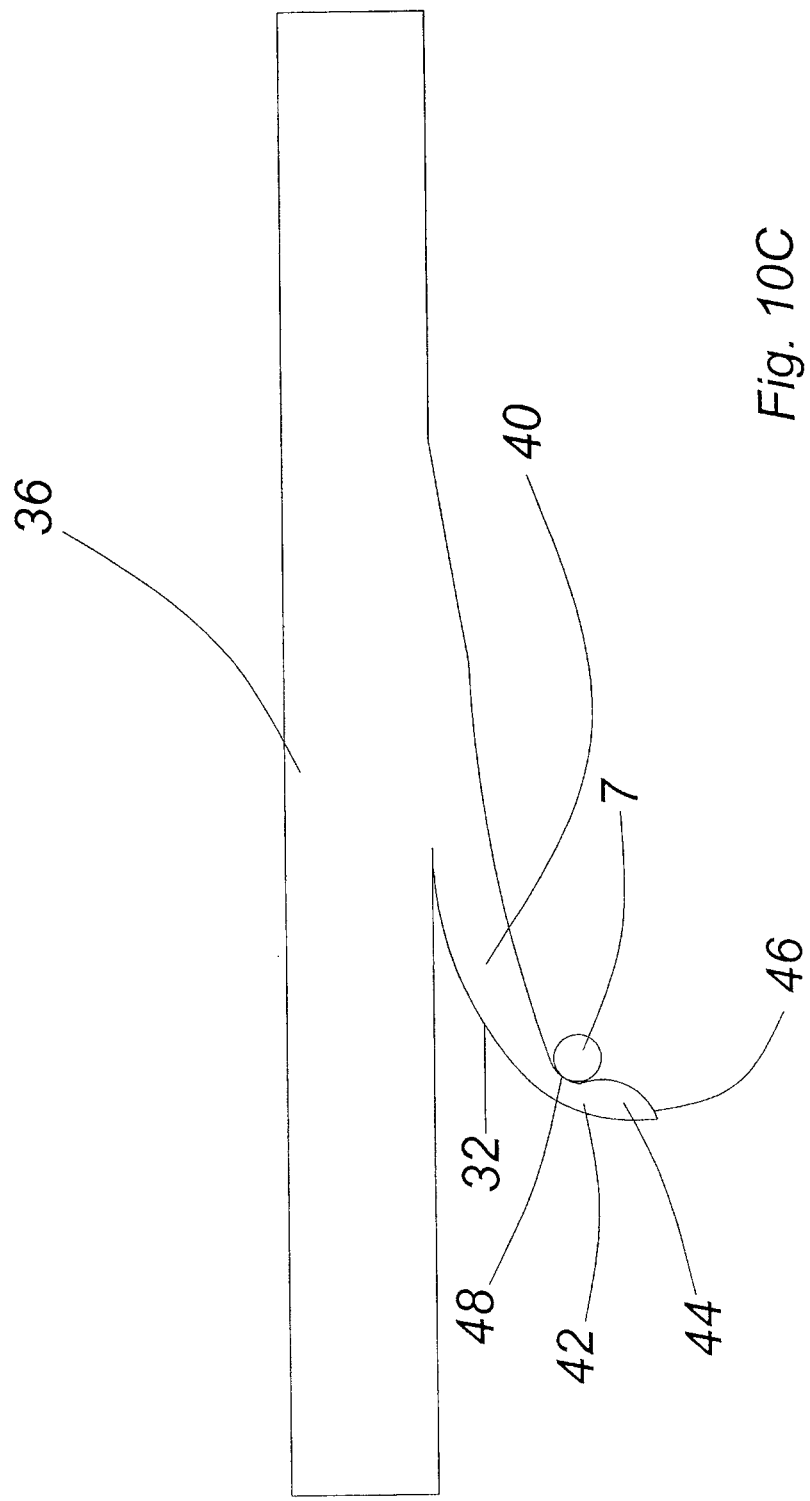

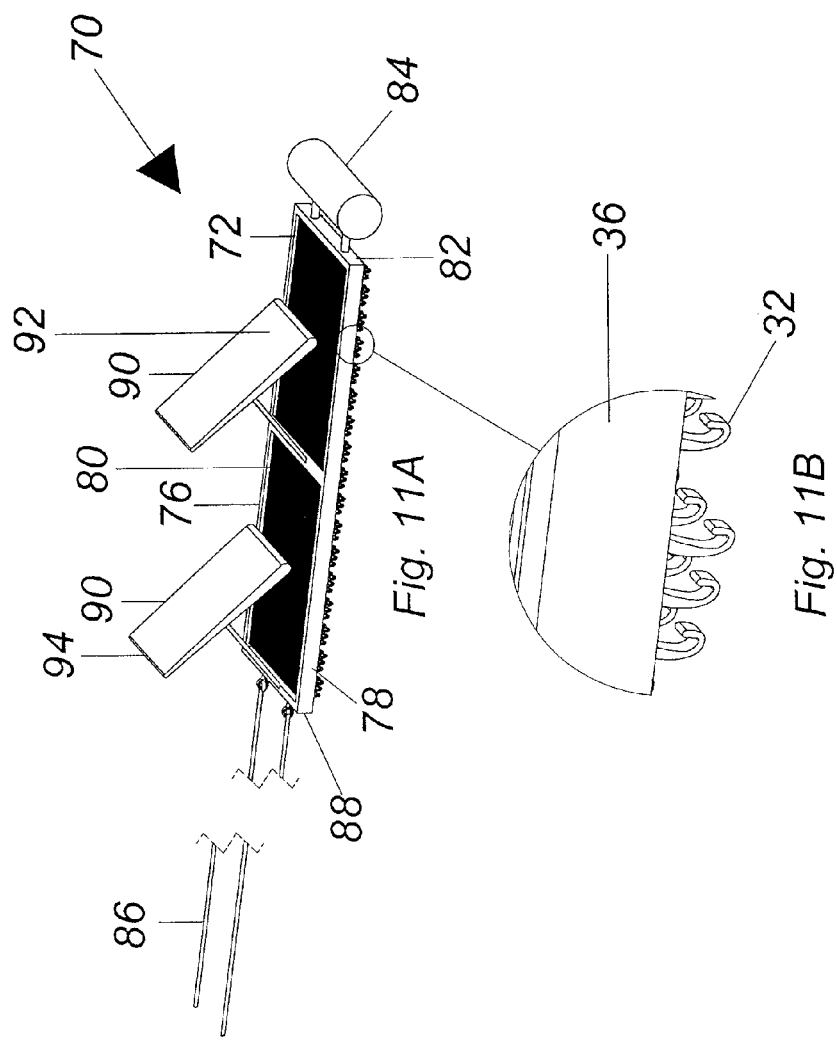

FISH CAGE SCREEN AND CLEANING APPARATUS

FIELD OF THE INVENTION

This invention is related to the field of open ocean aquaculture and in particular to an improved fish cage screen and cleaning apparatus.

BACKGROUND OF THE INVENTION

Fish farming or open ocean aquaculture is the rearing of marine organisms under controlled conditions in exposed high energy ocean environments. The purpose of the open ocean aquaculture is to raise a species of fish in a controlled environment wherein the open ocean allows for the natural cleansing of the holding pen. The open ocean aquaculture facilities consist of cages, holding pens, or the like that can be free floating, secured to a structure, or lowered to the ocean bottom. Open ocean aquaculture also makes use of the vast area of the ocean wherein cage size is not limited, as compared to the placement of cages within bays or the like tightly boarded area. The fish farming industry has enjoyed a steady strong growth for many years and can produce sustainable high quality fish products.

Fish farming has been done for thousands of years, yet in many ways it is still in its infancy. Environmental concerns and labor rates of the developed countries are the new barriers for continued growth of the industry. Offshore aquaculture is among the fastest growing industries today. Fish consumption is rising and wild stocks are unable to meet demand. Many ocean species contain valuable omega 3 oils that are recommended by doctors for good health. These oils are not abundantly found in fresh water species. The health benefits of ocean fish will continue to drive demand for ocean grown fish for decades to come. Offshore aquaculture has not developed in the United States despite the fact that we have the largest Exclusive Economic Zone in the world at 3.4 million square miles.

Historically ocean water fish farming has been done in protected near shore areas where access to the cages has been very good and cleaning and maintaining cage screens has been affordable and not prohibitive due to open sea conditions, distance and increasing labor rates. The netting is usually coated with antifouling material. The nets are removed and cleaned every few weeks and re-dipped in antifouling material, and then re-entered into the water. This process is presently under attack in Europe and Canada, because of the environmental impacts of the poisons introduced into the water during the cleaning process and while in use. Thousands of fish cages are doing this worldwide. The antifouling that reaches the ocean or bay floor reduces the ability of the floor to deal with by-products from the fish in the very worst cases. Antifouling paints are also under attack by environmentalist and the most effective antifouling paints are already banned in the United States.

Today many countries have used and over used the acceptable protected aquaculture sites and are now forced to go offshore to expand. The U.S. is committed to developing an offshore aquaculture plan for federal waters. Most of the U.S acceptable sites are 10 to 70 miles offshore and in areas that are susceptible to severe weather. The solution for severe weather areas is underwater cages that are not affected by surface waves.

The netting from offshore underwater cages cannot be efficiently removed for cleaning. The current solution is to scrub the cage screen underwater to remove fouling. The use of divers is expensive and the small fibers of the net contain small amounts of growth after cleaning and re-growth starts immediately.

Holding pens placed in offshore waters employ cages that are lowered and secured to the ocean bottom. Holding pens that are positioned near shore or in bays may consist of floating facilities. Extensive offshore floating facilities are currently found in most coastal countries such as Australia, Chile, China, France, Ireland, Italy, Japan and Norway. The United States has only a few open ocean facilities while other countries are experimenting with such facilities such as Panama, Korea, Spain, Mexico, Brazil and other Central and South American countries. Labor offshore has many difficulties including poor working conditions, health risks and transportation costs. This is especially true for underwater cages where divers are required for almost all of the work.

Environmental risk is the most common reason cited for lack of fish farming in the United States. Another reason is suggested likelihood of disease in densely populated farm cages, the risk of disease increased by unwanted growth on the cage. Unwanted growth also reduces oxygenated water flow through the cage and slows fish growth.

The aquaculture facilities may be used to house many different types of fish such as halibut, haddock, cod, flounder, black sea bass, snapper, cobia, yellow tale snapper, tuna, stripped bass, mahi mahi, and so forth.

BACKGROUND OF THE INVENTION

An underwater cage is susceptible to vegetation or algae growth which is fairly easy to remove if all sides of the cage material are periodically scrubbed. Fouling on an aquaculture screen is progressive in nature. Frequent cleaning of the earlier stages of growth help to prevent the growth from reaching later stages of hard growth that becomes progressively difficult to remove. Current cage cleaning methods are simple conventional brush devices used by hand or are power driven. The bending brush bristles can only contact about one-quarter to one-third of the strands at one pass. A second pass in the other direction will affect an additional one-quarter to one-third of the screen stand surface for cleaning. For a complete screening of the opposite side of the screen, the opposite side must also be brushed thereby doubling the cleaning effort.

Also used in the aquaculture industry are high pressure water cleaners. They are 15 to 60 horsepower, with larger units requiring a barge, crane and two operators. This expense is prohibitive for most aquaculture farms and is not suitable for farming offshore where the sea conditions make this type of equipment unusable. Current cage cleaner designs are typically corded and require robust power supplies, typically in the form of a generator on a barge. Aquaculture cages vary from site to site and manufacturer to manufacturer. Most have unique geometries that could pose a problem with corded devices where the cord could tangle with the internal geometry of the cage. Some current and expired technologies have been developed that are smaller electric or hydraulic powered devices. These have not been successful in the industry because conventional brushes do not work well enough and several passes on both sides of the screen are required for complete cleaning.

Additionally, almost all aquaculture cages have structure or corners that prevent the use of automated cage cleaning devices. Attempts to solve this problem have utilized robotics with tractor drives and live video for remote control. This comes at a very high cost and a human operator is also required.

DESCRIPTION OF THE PRIOR ART

Underwater cleaning devices are generally well known. U.S. Pat. No. 4,970,747, to Pastore, discloses a cleaning apparatus for cleaning underwater structures that is comprised of a cylindrical brush having a plurality of bristles that extend radially outward, a sealed electric motor for axially rotating the cylindrical brush, and a winch and cables used to raise and lower the cylindrical brush as it cleans the underwater structure. A substantially rectangular trough is displaced below the cleaning apparatus to collect debris that is removed from the underwater structure as the structure is being cleaned. The bristles are conventionally shaped.

Another type of underwater cleaning system is disclosed in published U.S. Patent Application 2002/0073493, to Walton. This system includes a brush or abrasive component which presses and scrubs against the surface to be cleaned, and also includes a fluid jet which drives water away from the surface, thereby producing a force against the surface. The brush is a stationary brush, with a handle for guidance by an underwater diver or from an arm at the surface; or the brush may be rotary or oscillatory to aid with the scrubbing action. The water jet may be incorporated into a tube which guides the water away from the surface. The tube produces a Venturi or Bernoulli effect which increases the water thrust and thus additional force against the surface.

Another type of underwater cleaning device is disclosed in U.S. Pat. No. 3,964,213, to Tobey. This device discloses an abrasive cleaning tool having various shaped ridges (FIG. 4); however such ridges are used to assist in the flushing of debris as a carbide treated screen (FIG. 3) is used for cleaning.

U.S. Pat. No. 3,628,489, to Michaelson, discloses a rotary brush for removing underwater fouling. This brush includes the use of metal blades spaced apart from the brushes to prevent damage to a surface.

U.S. Pat. No. 4,084,535, to Rees discloses an apparatus for cleaning or painting submerged surfaces. The apparatus includes rotary brushes that are either pneumatically or hydraulically driven and operated and positioned by underwater divers.

Another underwater cleaning system is disclosed in U.S. Pat. No. 6,070,547, to Achord. This device is held to the hull of a ship by suction, which is not possible when used with a cage structure.

U.S. Pat. No. 6,886,486, to Van Rompay, discloses the use of elastically deformable material for underwater cleaning of hulls. The material is rubber, or a rubber like material with relief in the form of nubs, ribs or protrusions.

Still another underwater cleaning machine is disclosed in U.S. Pat. No. 4,838,193 to van der Tak. This patent discloses an underwater scrubbing machine having rotary brushes for cleaning the growth off of vessels. The scrub brushes are conventional and do not provide any unique function in and of themselves.

U.S. Pat. No. 7,748,349, to Thorvardson, discloses a submersible cage having a net cleaning apparatus that consists of apertures in an arm in which fluid and/or a gas can be expelled towards the netting. Brushes are further used in scrubbing and cleaning of the netting. No mention is made of non-conventional bristles on the brushes.

U.S. Pat. No. 4,252,081, to Smith, discloses a fish cage that employs buoyancy to rotate the cage and expose portions of the cage above the water line for cleaning.

U.S. Pat. No. 5,930,862 is directed to a rug rake having wire bristles that are bent at their distal end.

U.S. Pat. No. 4,493,125, to Collins, discloses a toothbrush with curved bristles.

What is lacking in the prior art is an efficient, beneficial and cost effective aquaculture cage cleaning device and system.

SUMMARY OF THE INVENTION

The present invention includes a screen cleaning brush with multiple fibers or cleaning fingers made from a flexible material with a hook and barb shape. The hook is designed to trap the screen strand as it passes and rotate on a flexible arm to clean the opposite side of the strand and then flexes to release the strand. The cleaning material is ideally made from a rubber type material with good wear and flexible characteristics such as polyurethane, thermoplastic elastomers, silicones and rubbers. The scrubbing elements of the present invention are the breakthrough needed to make more efficient cage cleaning possible.

The current invention includes a scrubbing and cleaning device with a plurality of articulated fingers that can clean both sides of an aquaculture screen with one pass. Flexible hooked shaped fingers catch the back side of the screen member and are made of soft flexible polymers that will bend and clean as they release. If the fingers are long and stiffer, then the hook will rotate and bring the screen closer to the brush frame making it easier and more effective for the next advancing finger. This capability is a huge advantage where current and lack of support make cleaning significantly more difficult in many cases. Systems with linear motion are also contemplated.

Another problem with fish cage cleaning is wall angles and structure in the cage that interrupt the cleaning path of the scrubber. Such barriers and structure can make automated cleaning very difficult. Reversing one of the several rotating propeller wheels in the present invention can lift the assembly off the cage screen for short periods of time, changing the angle of attack, and then advance forward again to proceed on an alternate route or jump a barrier. The instant invention has unique propulsion and navigation systems that enable the device to jump barriers or corners, such as mechanical bumpers with signal capability. Specific combinations of forward, reverse and stop can drive the scrubber in any direction over any obstacle once the obstacle is located and understood. Likewise specific sensors and software can be used to guide the equipment for any cage environment and configuration. These sensors could include any combination of attitude and positioning sensors, such as electric wave sensors, low frequency communications, GPS, sonar, short baseline acoustic positioning (SBL), or the like to provide operational efficiency of the device.

Due to the cost-prohibitive nature of cleaning cages by hand, an automated and autonomous cleaner is needed, thereby lowering the cost and making frequent cleaning feasible. The invention includes a self contained power unit. The unit includes lithium polymer batteries that will deliver more than 0.12 watts per gram and 4.0 watts per hour. In addition the device can use a brushless D.C. motor that will provide a very high level of performance over a wide range of conditions. The invention maximizes the propulsion and scrubbing finger details and efficiency, thereby radically decreasing the power requirement. The device can achieve rotor tip speeds of 1 to 4 ft./sec. A device with scrubbing fingers of less than 75 A scale durometer and a double head approximately one meter wide would operate for two hours and weigh less than 100 pounds above the water and be neutrally buoyant. The apparatus will travel at two to four meters per minute and clean 220 to 400 square meters of screen in two hours automatically.

Accordingly, it is an objective of the instant invention to provide a cleaning device for an aquaculture cage having scrubbing fingers that are highly efficient and effective that will clean both sides of the cage screen with a single pass.

It is a further objective of the instant invention to provide an aquaculture cage cleaning device that maximizes the efficiency of the propulsion system of the apparatus thereby radically decreasing the power requirement.

It is yet another objective of the instant invention to provide an aquaculture cage cleaning device that can be automatically navigated over the surface of a cage regardless of the environment or cage configuration.

It is a still further objective of the invention to provide an aquaculture cage cleaning device that utilizes brushless DC motors that can be powered with either an integral battery system or power cord.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIG. 8 is a side view of the brush fingers prior to installation.

FIG. 9 is an enlarged view of one of the brush fingers as shown in circle B in FIG. 8.

FIGS. 10A through 10D show the interaction of the deformable brush finger with a screen strand as it approaches the strand, engages the strand and releases the strand. FIG. 10A is a pictorial of a strand engaging an end of the finger.

FIG. 10B is a pictorial of a strand entering the U-shaped pocket of the finger.

FIG. 10C is a pictorial of a strand causing extension of the finger.

FIG. 10D is a pictorial of a strand about to leave the end of the finger.

FIG. 11A is a perspective view of a cleaning brush structure with wings.

FIG. 11B an enlarged view of the cleaning brush fingers used on the cleaning brush structure.

DETAILED DESCRIPTION OF THE INVENTION

Aquaculture cages will experience two types of growth, which for reference will be called soft and hard. Soft growth is bacteria, fungus, algae, diatoms and grass. Hard growths are barnacles, oysters, mussels, clams, etc. Hard growths can be inhibited with a combination of surface finish and flexibility that affect their ability to attach to the cage. Controlling hard growth with screen extruded or molded plastics can be accomplished by keeping the flex modulus low enough to allow some flexing during use. The hard growths attachment gets stressed because the shell will not flex as screen flexing occurs and they cannot maintain attachment and fall off the screen. Flex modulus of plastics of 500 ksi and lower in diameters of 3.5 mm and smaller have been found effective to release hard growths of barnacles, clams, oysters and tube worms. Tensile strength of 8,000 psi have been found suitable with a surface durometer of D 75 or higher have been found effective against predators.

Soft growths can be more difficult to control, however tests have shown that they form more slowly on smooth hard surfaces and on surfaces with lower co-efficient of friction like PTFE and other low co-efficient of friction flouropolymers. Copper and silver are the oldest known antimicrobials and are effective against small soft growths; however weight, cost and fatigue are a problem for metal screens.

Many antimicrobial products for plastics have been developed for the medical industry. They are generally too expensive for other markets. The antimicrobial additive is usually blended into the plastic between one half and two percent at a minimum effective quantity to control cost. Most of the antimicrobial is locked deep inside the part where it cannot be beneficial and only a small surface quantity is effective. However, this process keeps the antimicrobial locked in the polymer and does not allow the antimicrobial to pollute the environment.

The present invention will mechanically clean the strands of material on aquaculture cage screens regardless of the material used for the strands and the types of growth needed to be removed.

Figure 1:
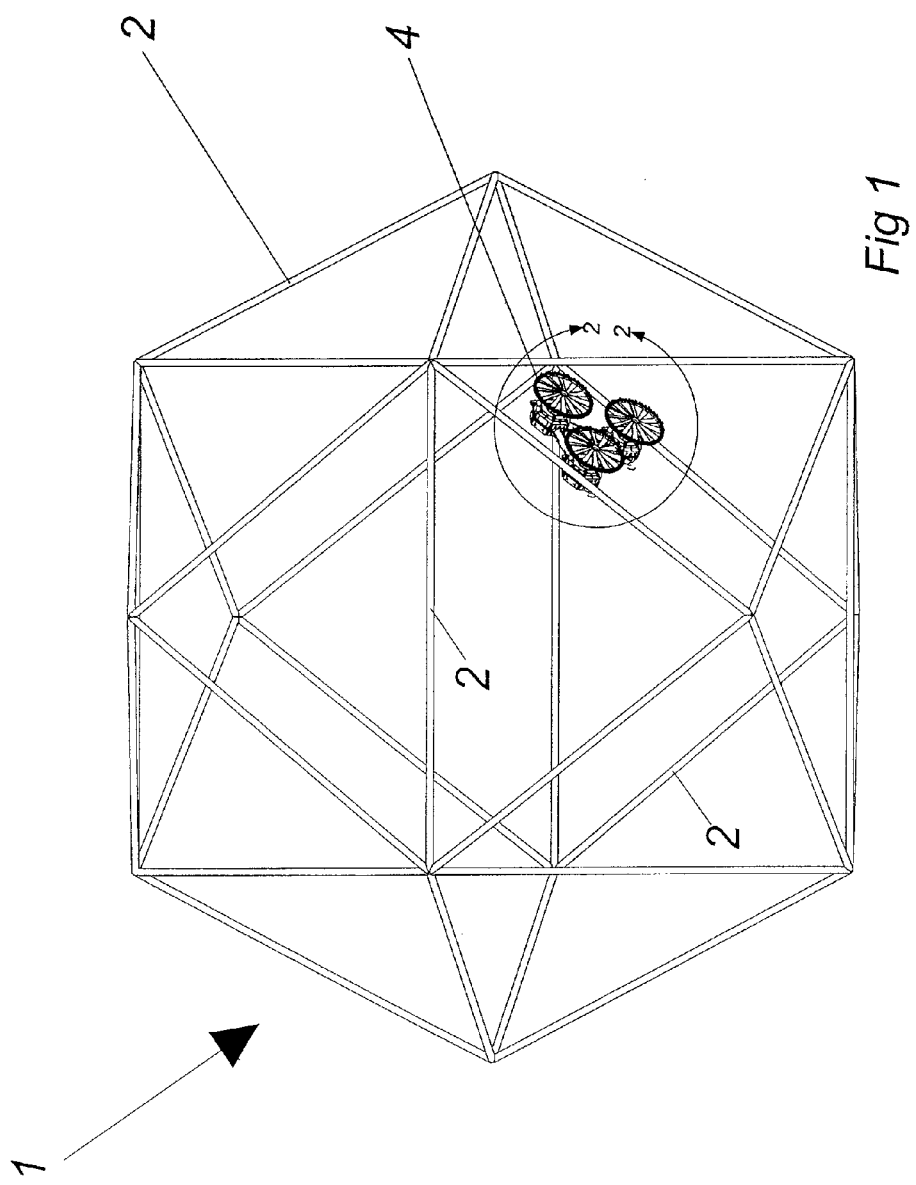
FIG. 1 is a perspective view of the aquaculture cage and the cleaning apparatus with the screen material removed for clarity.

FIG. 1 illustrates an aquaculture cage 1 having a plurality of support members 2 to form the superstructure for the cage 1. In this illustration the screen material has been removed for clarity. In practice, the entire cage 1 is enclosed by screening material that is attached to the surrounding support members 2. Located within the interior of the aquaculture cage 1 is a cleaning apparatus 4 of the instant invention. The cleaning apparatus 4 is preferably positioned within the cage but could, if desired, be positioned on the outer surface of the screening material.

Figure 2:
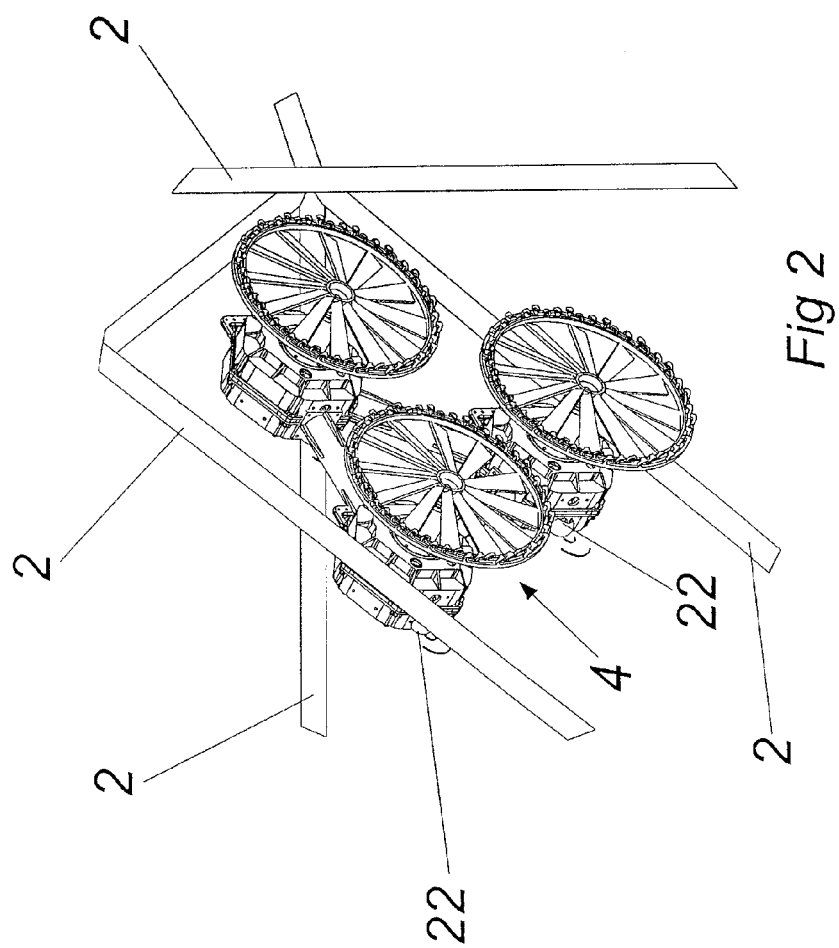
FIG. 2 is an enlarged perspective view of the cleaning apparatus within area A as shown in FIG. 1.

FIG. 2 is an enlarged view of the cleaning apparatus as shown within circle "A" in FIG. 1. This view shows a three unit cleaning apparatus 4 but it is contemplated that the number of units could range from one to as many as needed to suit that size and geometry of the cage 1.

Figure 3:
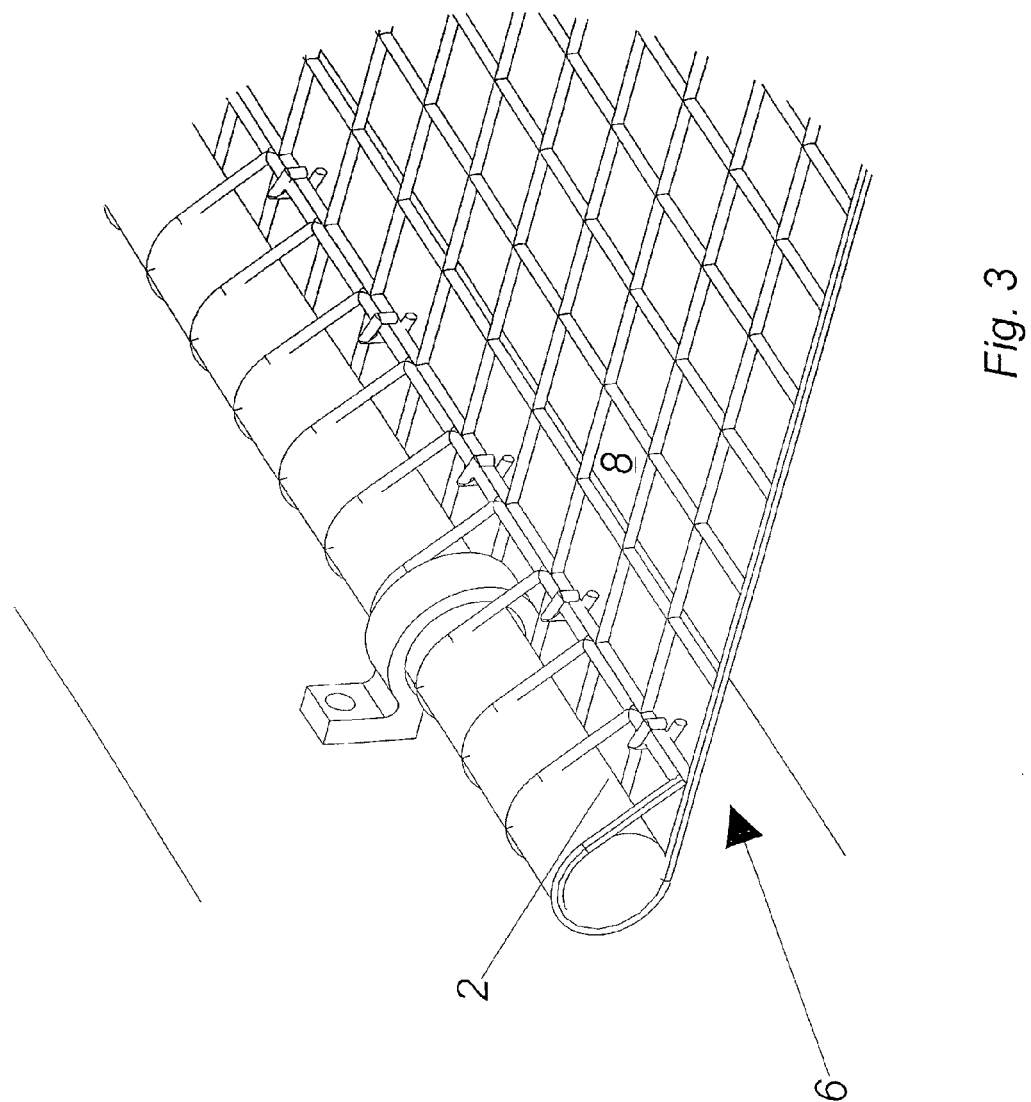
FIG. 3 is an enlarged view of the screen material as attached to the superstructure of the aquaculture cage.

FIG. 3 is a perspective view of an illustrative screen 6 as it is attached to one of the support members 2. The screen 6 is comprised of strands 7 of material that are orthogonally oriented to one another thereby creating a grid. The openings 8 within the grid are sufficiently small enough to retain the farmed fish within the aquaculture cage 1.

Figure 4:
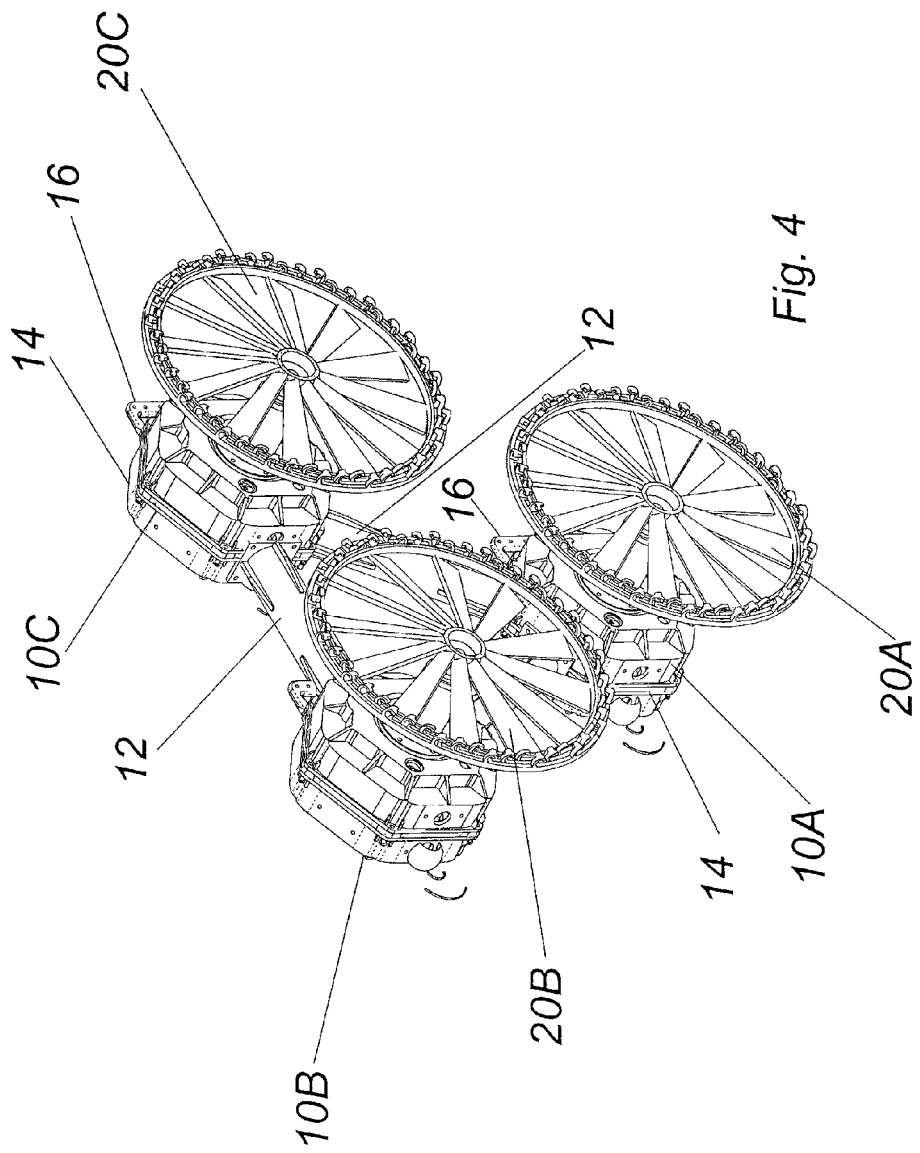
FIG. 4 is a perspective view of a three headed cleaning apparatus.

FIG. 4 is an illustration of a cleaning apparatus 4 having three units 10A, 10B and 10C. Unit 10A is connected to unit 10B by one structural beam 12 and to 10C by another structural beam 12. Likewise unit 10B is connected to 10C by a third structural beam 12. Each of the units 10A, 10B and 10C has a housing 14. Each housing 14 includes a self-contained power unit. The housing 14 includes lithium polymer batteries that will deliver more than 0.12 watts per gram and 4.0 watts per hour. Alternatively, the cleaning apparatus can be powered by a tethered external power source located out of the water. In addition, each housing 14 includes a brushless D.C. motor that will provide a very high level of performance over a wide range of conditions. One or all of the housings 14 contain sensors to facilitate the navigation of the cleaning apparatus within the aquaculture cage. Each unit also includes an external handle 16 that would enable a driver (s) to manually maneuver the cleaning apparatus in the water. The output of the motor contained within each housing 10A, 10B and 10C is connected to a head 20A, 20B and 20C through a rotary output shaft.

Figure 5:
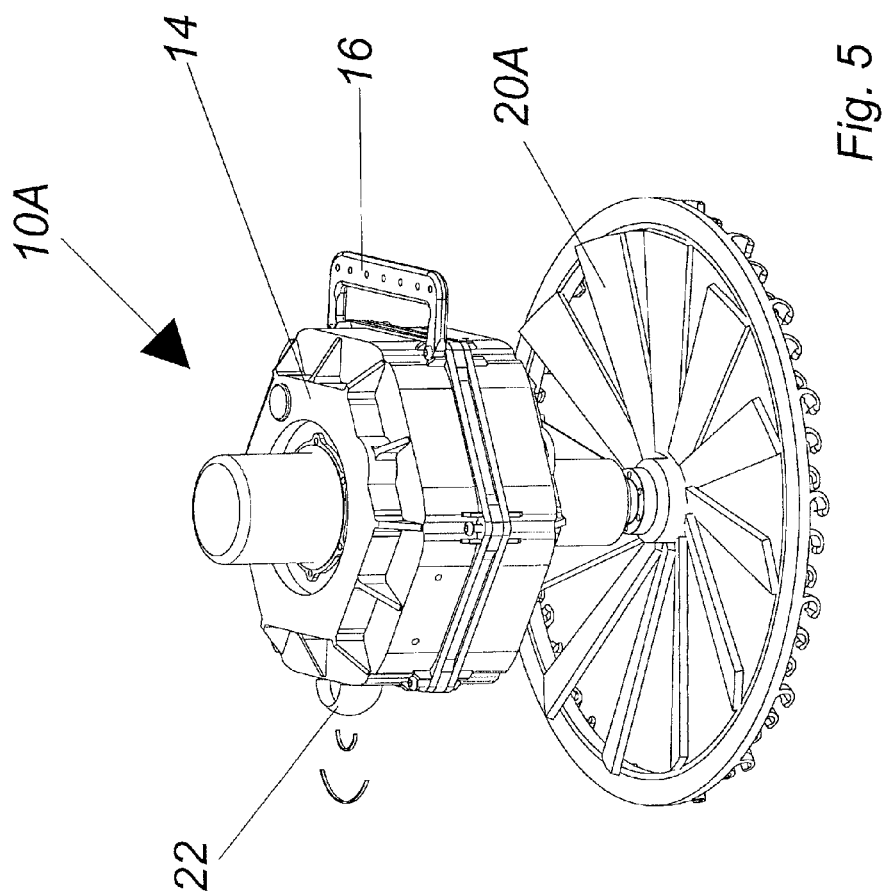
FIG. 5 is a perspective view of a single head cleaning apparatus.

FIG. 5 shows a single cleaning unit including a housing 14 with a handle 16, a cleaning brush head (20A, 20B, 20C) as well as a navigation sensor 22. Each unit can be fitted with a sensor 22. The sensors can be mechanical bumpers with signal capability. Specific combinations of forward, reverse and stop for each unit independently can drive the cleaning apparatus in any direction over any obstacle once the obstacle is located and understood. Likewise specific sensors and software can be used to guide the equipment for any cage environment and configuration. For example, the cage may be equipped with a home signaling device which is in communication with one or home sensors on the cleaning device. These sensors could include any combination of attitude direction and positioning sensors, such as electric wave sensors, low frequency communication, GPS, sonar, short baseline acoustic positioning (SBL), or the like to provide operational efficiency of the device. The input from the sensors would be inputted into a central processing unit which would enable the cleaning apparatus to learn the geometric configuration of the aquaculture cage 1. The central processing unit would either be carried on board the cleaning apparatus 1 or located on a floating platform above the water that is electrically tethered to the cleaning apparatus.

Figure 6:
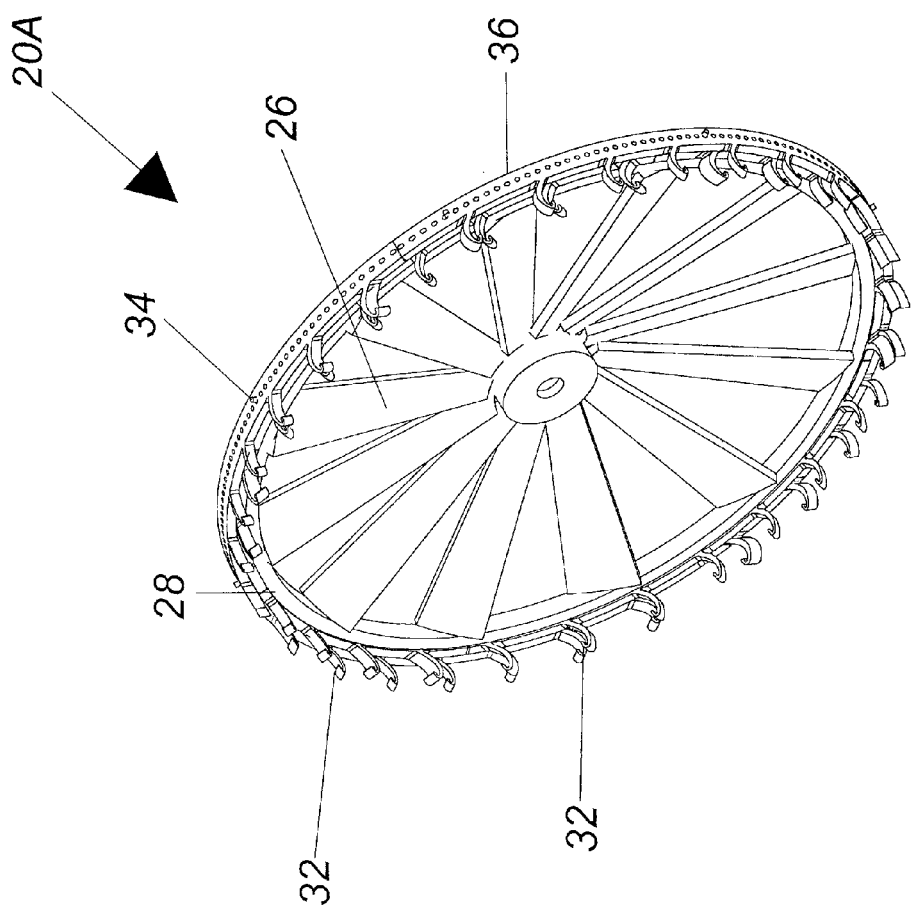
FIG. 6 is a perspective view of a cleaning brush rotor.

FIG. 6 shows a single brush head 20A, brush heads 20B and 20C are identical to brush head 20A. The brush head includes a central hub 24 for attaching the brush head to the motor output shaft contained with the unit housing 14. Circumferentially located and attached to the hub 24 is a plurality of propeller blades 26. The propeller blades 26 serve to propel the head or heads in a forward or reverse direction, while maneuvering the cleaning apparatus 4. In addition, the propeller blades 26 create a fluid flow jet that helps to flush the debris away from the screen. The opposite end of each propeller blade 26 is attached to a radially inwardly directed surface of a ring 28. A plurality of flexible hook shaped fingers 32 extend from the ring 28 in a direction perpendicular to the radially directed inward surface. The flexible hook shaped fingers 32 are located about the entire circumference of the ring. The flexible hook shaped fingers 32 are ideally made from a rubber type material with good wear and flexible characteristics such as polyurethane, thermoplastic elastomers, silicones and rubbers. Where the flexible hook shaped fingers are made from a thermo plastic elastomer it should have a durometer hardness of 40 to 90 on the A shore scale. In general, the flexible hook shaped fingers will have a hardness of less than 75 on the A shore scale. As shown in FIGS. 4 and 6 the flexible hook shaped fingers are configured as separate strips, each strip being radially spaced from one another. The flexible hook shaped fingers 32 between adjacent strips 36 are staggered from one another about the perimeter of the ring 28.

Figure 7:
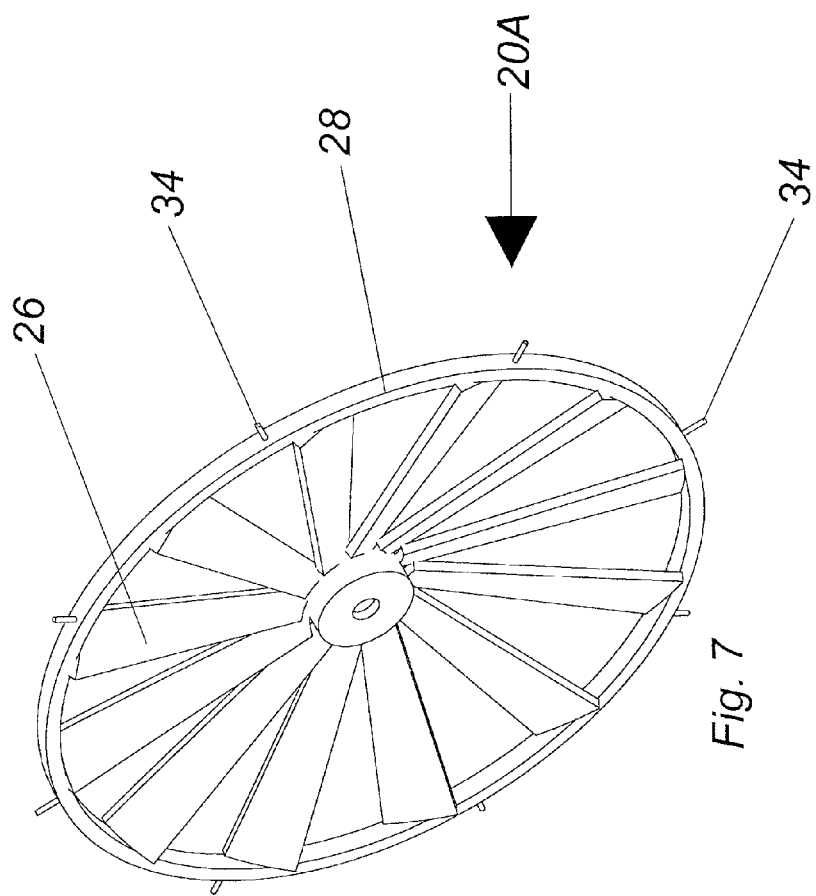
FIG. 7 is a perspective view of the hub without fingers, propeller blades and mounting ring for the brush material.

FIG. 7 illustrates a brush head 20A having a ring 28 which includes a plurality of pins 34 placed about its circumference. Pins 34 are sized and configured to mate with complimentary holes formed on each strip 36.

FIG. 8 is a side view of the flexible hook shaped fingers 32 prior to installation. The flexible hook shaped fingers 32 are formed on the elongated strip 36 that can be formed to the appropriate length. Once cut or formed to the proper length, the strip 36 is mounted on ring 28. A number of holes 38 on each strip are brought into alignment with pins 34 on ring 28.

FIG. 9 is an enlarged view of the circled section "B" in FIG. 8 with finger 32 depending therefrom.

Figure 10B:
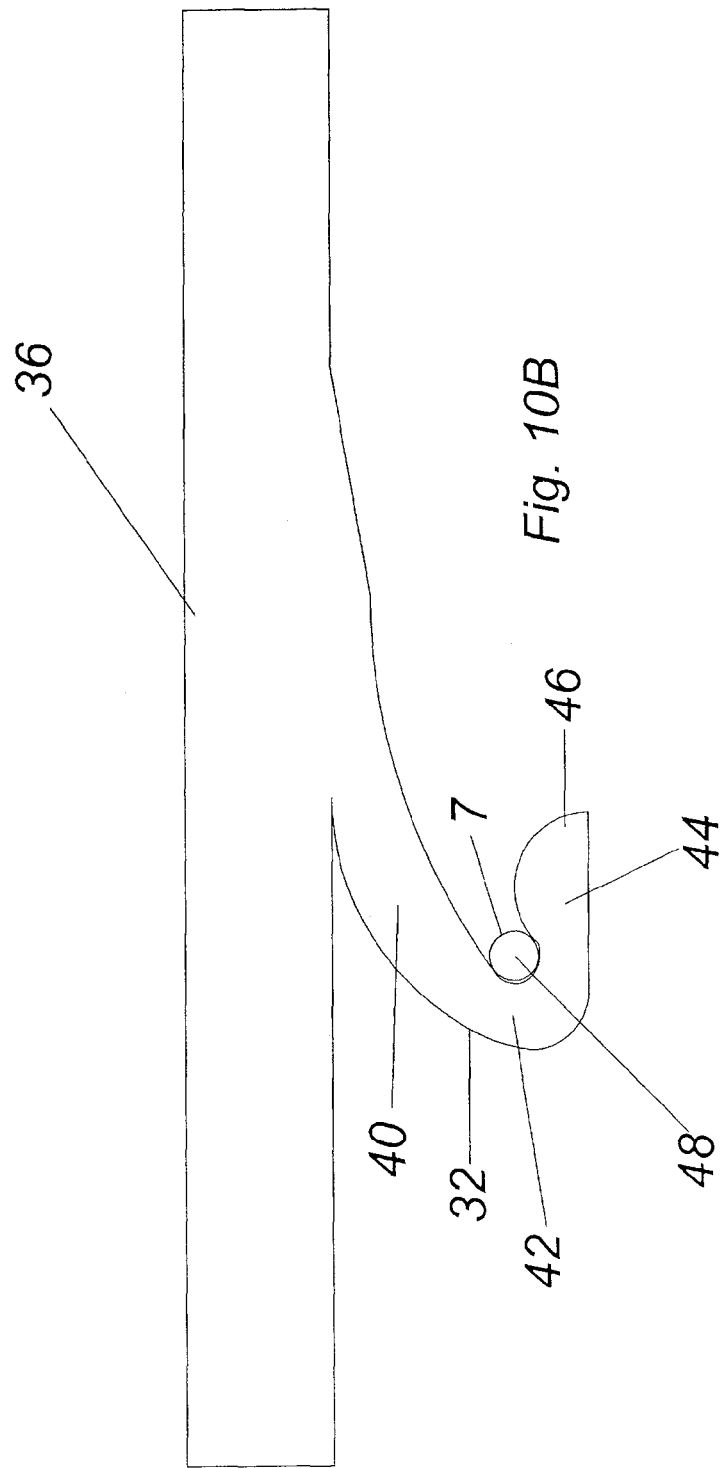
Figure 10D:
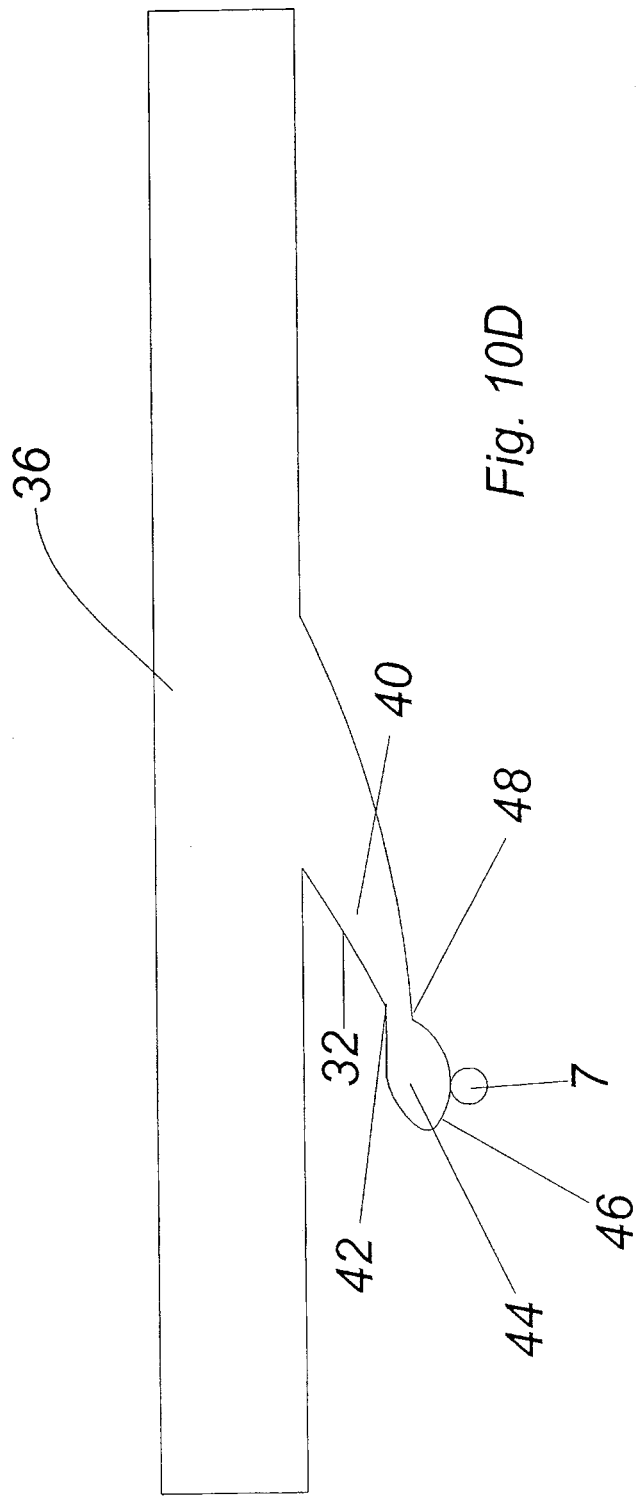

FIGS. 10A through 10D show the interaction of a single flexible hook shaped finger 32 with a screen strand 7 as it approaches the strand 7, engages the strand 7, and releases the strand 7. The flexible hook shaped finger 32 includes a first longer leg portion 40 that is attached to the elongated member 36 at one end and transitions to a generally "U" shaped portion 42 at the opposite end of the first longer leg portion 40. The opposite end of the "U" shaped bend portion 42 transitions into a second shorter leg portion 44. The other end of the shorter portion 44 terminates in a rounded tip 46. Within the "U" shaped bend portion 42, a "U" shaped channel 44 is formed. FIG. 10A shows the flexible hook shaped finger 32 as the tip 46 comes into contact with a single strand 7. FIG. 10B shows the strand 7 located within the "U" shaped channel 48. In this position, the flexible hook shaped finger 32 has been elastically deformed and the "U" shaped channel 48 expanded such that the strand 7 comes into frictional engagement with leg portions 40 and 44 as well as the "U" shaped channel 48. This mechanical contact of the flexible hook shaped finger and the strand 7 acts to clean both sides of the strand 7, hence the screen, simultaneously. As the brush head continues in its rotary path the flexible hook shaped finger 32 will continue to deform as shown in FIG. 10C. In this position, the "U" shaped portion is elastically deformed into a position where the U-shape is substantially straightened while still maintaining an engagement with strand 7. FIG. 10D shows the relationship between the flexible hook shaped finger 32 and the strand 7 just prior to the release of the brush 32 from the strand 7. In this stage of the cleaning action the flexible hook shaped finger 32 has been elastically deformed and substantially straightened. Just prior to release, the tip 46 of the finger 32 remains in contact with strand 7. The process continues with each finger on the brush head continuously engaging pluralities of strands 7 on the screen 6. The cleaning apparatus 4 continues to move about the cage 1 until the screen surfaces have been cleaned.

In another embodiment, a scrubber structure 70 can be used. The scrubber structure 70 is constructed from a rigid frame 72 having a plurality of flexible hook shaped fingers 32 depending from a plurality of elongated strips 36 that attached to the rigid frame 72. In this embodiment, attachment to the frame can be by use of pins extending between the side walls 76 & 78 of the frame or a backing plate 80 can be integrated into the frame. At a first end 82 of the frame 72 is a ballast weight 84 that permits the sinking of the scrubber structure. Lines 86 are positioned along a second end 88 of the frame to allow for the controlled lowering of the scrubber structure into the water and lifting therefrom. Fins 90 have a front surface that use the density of the water to push the scrubber structure against a screen while the structure is being lowered. The rear surface 94 uses the density of the water to pull the scrubber structure away from a screen while the structure is being lifted. As with the previous embodiment, the fingers 32 are used to engage the screen for cleaning purposes.

In operation, the scrubber structure 70 can be lowered by an individual standing above the surface of the water who is holding on to the lines 86. The ballast weight is constructed and arranged to have sufficient weight to overcome any buoyancy of the scrubber structure 70. As the scrubber structure 70 is lowered, fins 90 have a front surface 92 use the density of the water to push the scrubber structure against a screen wherein the fingers 32 are used to engage the screen for cleaning purposes as fully described in the previous embodiment. When the scrubber structure 70 is lifted, the rear surface 94 of the fins 90 uses the density of the water to pull the scrubber structure away from the screen. The operator can then reposition over the next area to be cleaned an repeat these steps.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An aquaculture cage screen cleaning device comprising; a brush head including a strip having a plurality of holes and a plurality of flexible hook shaped fingers formed on said strip, said brush head in operative engagement with a power output to cause said brush head and said plurality of flexible hook shaped fingers to move across an aquaculture cage screen having an inner surface and an outer surface, said flexible hook shaped fingers are made from a thermoplastic elastomer with a durometer of 40 to 90 A shore scale being sized and configured to elastically deform around individual screen strands that form said aquaculture cage screen to disengage growth therefrom, wherein the placement of said brush head on a screen surface of said aquaculture cage screen permits said flexible hook shaped fingers to clean the inner and outer surfaces of said aquaculture cage screen from the same side surface, wherein the plurality of flexible hook shaped fingers on said brush head is moved in a rotating manner, whereby the flexible hook shaped fingers along a leading edge of said brush head elastically deform around individual screen strands that form said aquaculture cage screen to disengage growth therefrom in a first direction and then in a second direction as the brush head rotates and the trailing edge of the brush head passes over the screen, said brush head has a plurality of propeller blades extending radially from a hub an inner diameter to a ring such that when said brush head is moved in a rotating manner it produces forces for advancing the motion of the brush head, said ring includes pins placed about a circumference of said ring, said pins are sized and configured to mate with complimentary holes formed on said strip.

2. An aquaculture cage screen cleaning device comprising a plurality of brush heads, each brush head including a strip having a plurality of holes and a plurality of flexible hook shaped fingers formed on said strip, said brush head in operative engagement with a power output to cause said brush head and said plurality of flexible hook shaped fingers to move across an aquaculture cage screen having an inner surface and an outer surface, said flexible hook shaped fingers are made from a thermoplastic elastomer with a durometer of 40 to 90 A shore scale being sized and configured to elastically deform around individual screen strands that form said aquaculture cage screen to disengage growth therefrom, wherein the placement of said brush head on a screen surface of said aquaculture cage screen permits said flexible hook shaped fingers to clean the inner and outer surfaces of said aquaculture cage screen from the same side surface, wherein the plurality of flexible hook shaped fingers on said brush head is moved in a rotating manner, whereby the flexible hook shaped fingers along a leading edge of said brush head elastically deform around individual screen strands that form said aquaculture cage screen to disengage growth therefrom in a first direction and then in a second direction as the brush head rotates and the trailing edge of the brush head passes over the screen, said brush head has a plurality of propeller blades extending radially from a hub an inner diameter to a ring such that when said brush head is moved in a rotating manner it produces forces for advancing the motion of the brush head, said ring includes pins placed about a circumference of said ring, said pins are sized and configured to mate with complimentary holes formed on said strip, wherein the motion of said brush heads is articulated by controlling a rotational speed of each of the rings relative to one another.

3. The aquaculture cage screen cleaning device of claim 2 wherein the motion of said brush heads is articulated by reversing the direction of one or more rings.

4. An automatic aquaculture cage screen cleaning device comprising one or more propulsion devices, one or more sensors and a central processing unit whereby the propulsion system is controlled by the central processing unit based on the information received from the one or more sensors and enabling the cleaning device to navigate a screen surface of said aquaculture cage screen cleaning device, one or more brush heads including a strip having a plurality of holes and a plurality of flexible hook shaped fingers formed on said strip, said brush head in operative engagement with a power output to cause said brush head and said plurality of flexible hook shaped fingers to move across an aquaculture cage screen having an inner surface and an outer surface, said flexible hook shaped fingers are made from a thermoplastic elastomer with a durometer of 40 to 90 A shore scale being sized and configured to elastically deform around individual screen strands that form said aquaculture cage screen to disengage growth therefrom, wherein the placement of said brush head on a screen surface of said aquaculture cage screen permits said flexible hook shaped fingers to clean the inner and outer surfaces of said aquaculture cage screen from the same side surface, wherein the plurality of flexible hook shaped fingers on said brush head is moved in a rotating manner, whereby the flexible hook shaped fingers along a leading edge of said brush head elastically deform around individual screen strands that form said aquaculture cage screen to disengage growth therefrom in a first direction and then in a second direction as the brush head rotates and the trailing edge of the brush head passes over the screen, said brush head has a plurality of propeller blades extending radially from a hub an inner diameter to a ring such that when said brush head is moved in a rotating manner it produces forces for advancing the motion of the brush head, said ring includes pins placed about a circumference of said ring, said pins are sized and configured to mate with complimentary holes formed on said strip, said each brush head includes one of said propulsion devices and one of said sensors.

5. The automatic aquaculture cage screen cleaning device of claim 4 wherein at least one of said sensors can detect an obstacle and reverse said propulsion system to escape the obstacle and then resume normal operation.

6. The automatic aquaculture cage screen cleaning device of claim 4 wherein one of said sensors is a position sensor to guide said cleaning device.

7. The automatic aquaculture cage screen cleaning device of claim 4 wherein one of said sensors on said cleaning device communicates with a home signal device mounted in a aquaculture cage screen thereby enabling the cleaning device to navigate said aquaculture cage screen.

8. The automatic aquaculture cage screen cleaning device of claim 4 further including a plurality of propellers that will propel the cleaning device at a speed of 1 to 4 feet per second.

9. The automatic aquaculture cage screen cleaning device of claim 4 further including each of said flexible hook shaped fingers made from a material with less than 75 a shore durometer hardness.

10. The automatic aquaculture cage screen cleaning device of claim 4 further including one or more self-contained battery sources within said cleaning device.

* * * * *